(12) United States Patent
Olausson et al.

(10) Patent No.: US 9,250,772 B2
(45) Date of Patent: Feb. 2, 2016

(54) METHOD AND SYSTEM FOR MONITORING AN INDUSTRIAL PROCESS

(71) Applicant: ABB Research Ltd., Zurich (CH)

(72) Inventors: Martin Olausson, Vasteras (SE); Susanne Timsjo, Vasteras (SE); Anders Hanberg, Vasteras (SE)

(73) Assignee: ABB Research Ltd., Zurich (CH)

( * ) Notice: Subject to any disclaimer, the term of this patent is extended or adjusted under 35 U.S.C. 154(b) by 345 days.

(21) Appl. No.: 13/858,623

(22) Filed: Apr. 8, 2013

(65) Prior Publication Data

US 2013/0227459 A1    Aug. 29, 2013

Related U.S. Application Data

(63) Continuation of application No. PCT/EP2010/065122, filed on Oct. 8, 2010.

(51) Int. Cl.
*G06F 3/0484* (2013.01)
*G05B 19/042* (2006.01)
*G05B 19/409* (2006.01)

(52) U.S. Cl.
CPC ............ *G06F 3/0484* (2013.01); *G05B 19/042* (2013.01); *G05B 19/409* (2013.01); *G05B 2219/23316* (2013.01); *G05B 2219/23434* (2013.01)

(58) Field of Classification Search
CPC .................. G05B 19/409; G05B 2219/23316; G05B 2219/23434; G06F 3/0484

USPC ......... 715/765, 778, 771, 768, 867, 965, 764, 715/781, 811, 815
See application file for complete search history.

(56) References Cited

U.S. PATENT DOCUMENTS 7,307,647 B2    12/2007    Hatori et al.
7,681,143 B2    3/2010    Lindsay et al.
(Continued)

FOREIGN PATENT DOCUMENTS

WO    2006103541 A1    10/2006

OTHER PUBLICATIONS

International Preliminary Report on Patentability Application No. PCT/EP2010/065122 Completed: Dec. 10, 2012 12 pages.
(Continued)

*Primary Examiner* — Rashawn Tillery
(74) *Attorney, Agent, or Firm* — Whitmyer IP Group LLC

(57) ABSTRACT

A method for monitoring an industrial process with a graphical user interface of an operator panel. The graphical user interface is adapted to change between a default mode in which it presents a plurality of objects related to the industrial process, and a user-adapted mode in which a subset of the plurality of objects is presented. The subset of objects is selected based on a parameter value which is associated with each object of the plurality of objects. The graphical user interface enters the user-adapted mode by the method determining whether a time of inactivity of the operator panel exceeds a threshold value, and, provided that the threshold value has been exceeded, removing those objects of the plurality of objects on the graphical user interface which are not included in the subset of objects.

14 Claims, 2 Drawing Sheets

(56) References Cited

U.S. PATENT DOCUMENTS

| | | |
|---|---|---|
| 7,765,488 B2 | 7/2010 | Pagan |
| 2003/0234246 A1 | 12/2003 | Arnold |
| 2006/0184891 A1 | 8/2006 | Parker et al. |
| 2007/0093937 A1* | 4/2007 | Reasoner et al. .............. 700/245 |
| 2007/0136682 A1* | 6/2007 | Stienhans ..................... 715/789 |
| 2010/0107112 A1* | 4/2010 | Jennings et al. .............. 715/777 |

OTHER PUBLICATIONS

International Search Report and Written Opinion of the International Searching Authority Application No. PCT/EP2010/065122 Completed: Jun. 30, 2011; Mailing Date: Jul. 8, 2011 10 pages.

Written Opinion of the International Preliminary Examining Authortiy Application No. PCT/EP2010/065122 Mailing date: Oct. 18, 2012 7 pages.

* cited by examiner

METHOD AND SYSTEM FOR MONITORING AN INDUSTRIAL PROCESS

FIELD OF THE INVENTION

The invention generally relates to monitoring of industrial processes and in particular to monitoring an industrial process with a graphical user interface which can change between different modes of operation.

BACKGROUND OF THE INVENTION

Operators of an industrial process normally utilize display screens which present important process parameters for the operator. The process parameters may typically be controlled via an operator panel.

Generally, operators monitoring the industrial process occasionally will need to move away from the display screen in order to carry out other duties involved in their daily work. However, even when having moved away from a display screen, the operators will still need to have knowledge about the parameters of the process in order to be able to ensure control of the process.

US 2007/0093937 discloses an operator control panel having a replaceable default screen. The operator control panel is configured to have a thumb tack function which allows the user to select a desired status screen from screen display that is available in a menu structure. Operational screens are selected, such as by switching the state of the graphical thumb tack. If selected, the operational screen is displayed during a period of inactivity instead of the default screen. An operational screen is a view of the user interface that is selected for the purpose of being displayed during a period of inactivity so that status can quickly be ascertained without additional user interaction with the user interface.

However, for the purposes of industrial processes and automation, there exist drawbacks with the control panel disclosed in US 2007/0093937.

SUMMARY OF THE INVENTION

A general object of the present invention is to provide an improved method and system for monitoring an industrial process.

A further object is to provide a method and system in which only those objects describing the process which are most utilized by the operator remain displayed to the operator when a predetermined amount of time of user-inactivity has occurred.

An industrial process is herein defined as any automated or semi-automated manufacturing process that typically needs to be monitored, e.g. where process parameters are monitored. The industrial process may for instance be a process in automobile manufacturing, manufacturing of equipment for power systems, steel industry processes, chemical processes or any other automated or semi-automated process.

According to a first aspect of the present invention there is provided a method for monitoring an industrial process with a graphical user interface of an operator panel, the operator panel being operatively connected to the industrial process for communicating with the industrial process, wherein the graphical user interface is arranged to present a plurality of objects simultaneously in a default mode, the plurality of objects pertaining to the industrial process, at least some of the plurality of objects being controllable by means of the operator panel for controlling the industrial process, each object of the plurality of objects being associated with a parameter value, wherein the graphical user interface is arranged to present a subset of the plurality of objects in a user-adapted mode, wherein each object of the subset of objects has a parameter value that exceeds a predetermined value, the method comprising:

determining whether a time of inactivity of the operator panel exceeds a threshold value, and, provided that the threshold value has been exceeded, removing those objects of the plurality of objects on the graphical user interface which are not included in the subset of objects, wherein the subset of objects remain displayed on the graphical user interface thereby providing the user-adapted mode of the graphical user interface.

At least one effect which may be obtainable by removing those objects which have a parameter value that exceeds a threshold is that only the most relevant objects may be presented on the graphical user interface. Beneficially, an operator monitoring the industrial process may thereby more easily be able to monitor the process even when not situated closely to the graphical user interface because non-relevant information has been removed from the graphical user interface.

In particular, the parameter values may typically relate to those sub-processes or process parameters which typically are most important to monitor.

The exceeding of the threshold value for the parameters of the objects may be construed as an absolute value, i.e. they may be defined as a positive or negative threshold value.

One embodiment may further comprise enlarging each object of the subset of objects such that the subset of objects essentially cover the graphical user interface. Thereby, it is even easier to monitor the process from a distance.

One embodiment may further comprise selecting the subset of objects from the plurality of objects displayed simultaneously on the graphical user interface in the default mode. The selecting may be performed dependent of time in the process, or the selection of objects may be fixed, independent of time.

The selecting may be based on statistical data with the parameter values relating to a usage rate of the plurality of objects. Hence, it may be determined which process parameters of the industrial process a user monitoring the process most often utilizes in his or her work duties.

The subset of objects may comprise at least two objects of the plurality of objects.

One embodiment may further comprise returning to the default mode upon detecting activity in the operator panel. Thereby, the graphical user interface may switch between the default mode and the user-adapted mode when an operator or user would like to e.g. study the status of the non-displayed objects, or control the industrial process by means of the objects.

One embodiment may further comprise defining the parameter value for each of the plurality of objects.

In a second aspect of the present invention there is provided a system for monitoring an industrial process, the system comprising:

an operator panel having a graphical user interface, the operator panel being operatively connected to the industrial process for communicating with the industrial process, wherein the graphical user interface is arranged to present a plurality of objects simultaneously in a default mode, the plurality of objects pertaining to the industrial process, at least some of the plurality of objects being controllable by means of the operator panel for controlling the industrial process, each of the plurality of object being associated with a parameter value, wherein the graphical user interface is arranged to present a subset of the plurality of objects in a user-adapted mode, each object of the subset of objects having a parameter value that exceeds a predetermined value, and a processor arranged to determine when the graphical user interface is to display the default mode and when to display the user-adapted mode, and to determine whether a time of inactivity of the operator panel exceeds a threshold value, and, provided that the threshold value has been exceeded, arranged to remove those objects of the plurality of objects on the graphical user interface which are not included in the subset of objects, wherein the subset of objects remain displayed on the graphical user interface thereby providing the user-adapted mode of the graphical user interface.

The processor may be arranged to select the subset of the plurality of objects based on statistical data relating to a usage rate of the plurality of objects.

The processor may be configured to enlarge each object of the subset of objects such that the subset of objects essentially covers the entire graphical user interface.

The processor may be arranged to define a parameter value for each of the plurality of objects.

In a third aspect of the present invention, a computer program is provided, which computer program is stored on a computer readable medium, which computer program when executed performs the method steps according to the first aspect.

The computer readable medium may e.g. be a memory in the processor.

Additional possible features and preferred embodiments are set out and disclosed in the following.

BRIEF DESCRIPTION OF THE DRAWINGS

The invention and further advantages thereof will now be described in more detail with reference to the accompanying drawings of which.

DETAILED DESCRIPTION OF THE INVENTION

Figure 1:
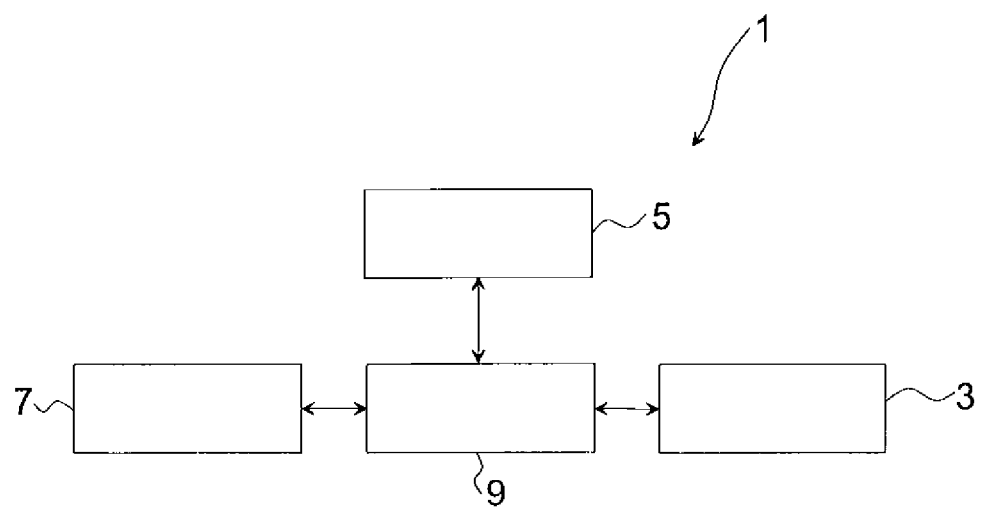
FIG. 1 shows a block diagram of a system for monitoring an industrial process according to an embodiment of the present invention.

FIG. 1 shows an example of a system 1 for monitoring an industrial process according to the present invention. The industrial process as such typically involves a plurality of devices and apparatus for carrying out the various steps of the process in a plant such as a chemical plant, a pharmaceutical plant, a mine, an oil production or distribution installation, gas pipe-line and/or off-shore platform or an oil refinery, a pulp and paper mill, a steel mill or metal smelter, or in control rooms for power generation, transmission and distribution. Generally such industrial processes typically have a control system that includes one or more workstations with an operator panel comprising a Human-Machine Interface (HMI), preferably arranged as a graphical user interface (GUI). The operator panels or workstations may be arranged as stand-alone units or workstations or as groups of workstations in, for example a control room. Typically such control system GUIs include a great quantity of information about the process and the plant being monitored and/or controlled. Other examples of industries and utilities where control systems with GUI-based operator panels are used are automotive manufacturing plants, general manufacturing, pure and waste water handling. Herein, the devices and apparatus that carry out the industrial process will be referred to as an industrial assembly 3.

The system 1 comprises an operator panel 5, a graphical user interface (GUI) 7, and a processor 9. The processor 7 is operatively connected to the GUI 7 and the operator panel 5.

The operator panel 5 may for instance be a keyboard, mouse, or similar input/output device. The operator panel 5 may hence act as an interface between a user of the system 1 and the industrial process.

The GUI 7 may typically be exemplified by a display, which present information received from the processor 7 to a user of the system 1. In one embodiment, the GUI 7 may be of touch-screen type, wherein the operator panel 5 and the GUI 7 may be seen as the same unit within the system 1.

The system 1 may in one embodiment be integrated, wherein the GUI 7, the operator panel 5, and the processor 9 are housed in an integrated unit.

In one embodiment, the operator panel 5 may be a unit separate from the GUI 7, with the operator panel 5 comprising the processor 9. Alternatively, each of the GUI 7, the operator panel 5, and the processor may constitute separately housed units.

The processor 9 is typically arranged to receive signals pertaining to the industrial process. The signals may be analog or digital. In case the signals received are analog, the processor converts the signals to digital data by means of an analog-to-digital converter. In another variation of the invention, the processor receives digital data.

The signals typically provide information regarding the status of the process such as real-time values of important process parameters. Further, the processor 9 is arranged to receive user-input signals from the control panel 5. The processor 9 is also arranged to provide signals to the GUI 7.

The processor 9 is typically arranged to send signals to the industrial assembly 3 for controlling at least a part of the industrial process. Sent signals typically pertain to user input from the control panel 5.

In order for a user to be able to monitor and control the industrial process, the GUI 7 presents objects O-1, O-2, O-3, O-4 (see e.g. FIG. 2a) pertaining to the industrial process. Objects may for instance relate to process parameters such as thickness of a metal strip, rolling speed, temperature in a steel mill, steam pressure in part of a pulp and paper process, flow data for liquid or gas oil or gas materials or mixtures in a pipeline; a current or voltage value at a power distribution network node or a breaker, transformer, and so on.

The GUI 7 may of course also present more or less than four objects, but for illustrative purposes, in the examples herein, four objects will be used.

In one embodiment, the processor 9 is able to determine when a time of inactivity of the operator panel 5 exceeds a predetermined threshold value. The term inactivity is herein defined as there being no user input to the operator panel 5, and hence no user-input data to the processor 9.

Figure 2A:
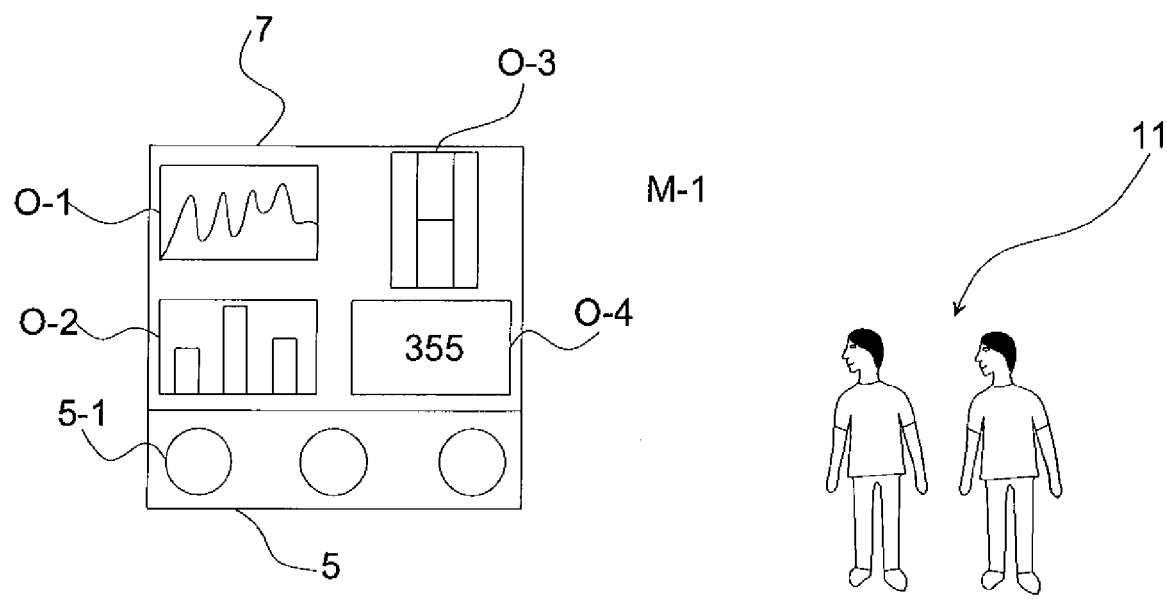
FIG. 2a shows an example of the system in FIG. 1 in use, in which a graphical user interface of the system presents object thereon in a default mode.
Figure 2B:
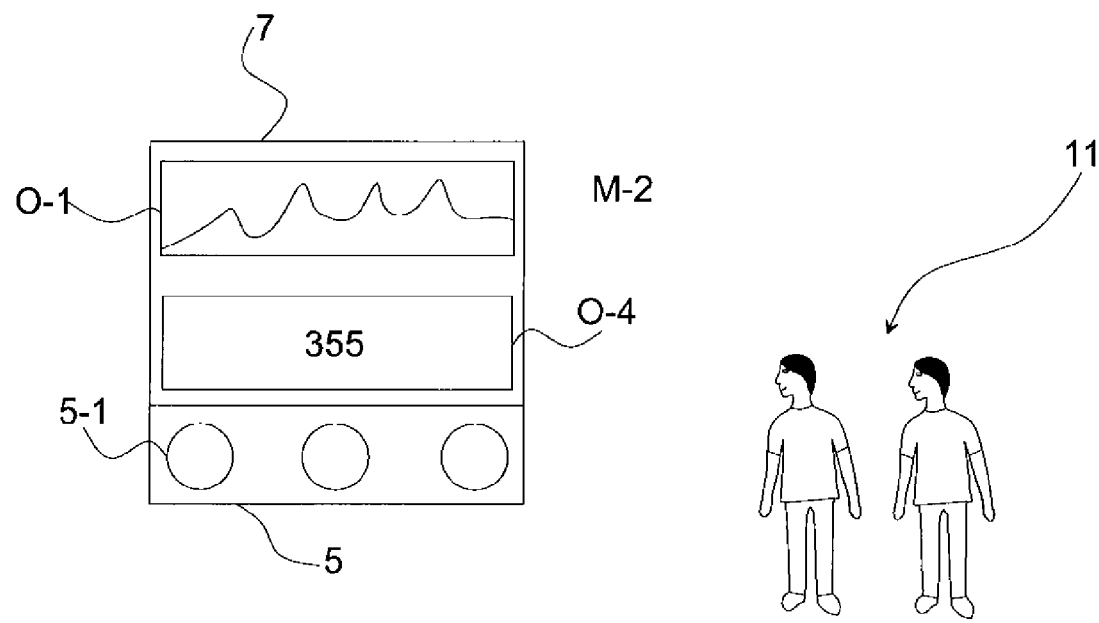
FIG. 2b shows the system in FIG. 2a, with the graphical user interface in a user-adapted mode.

With reference to FIGS. 2a and 2b, the invention will now be described in more detail.

FIG. 2a shows an example of the system 1 in FIG. 1 in use, in which the GUI 7 of the system 1 presents object thereon in a default mode M-1. As already described above, the GUI 7 is operatively connected to the operator panel 5 having means 5-1 for allowing a user to input a command via the operator panel 5. Such means may e.g. be a keyboard, a mouse or a similar device, as would be apparent to the skilled person.

In the default mode M-1, typically a plurality of objects O-1, O-2, O-3, O-4 are presented on the GUI 7. The objects O-1, O-2, O-3, O-4 normally describe the status of the industrial process, e.g. by presenting various process parameters to an operator 11 monitoring the industrial process. The objects O-1, O-2, O-3, O-4 typically present dynamic data pertaining to the industrial process.

Because a plurality of objects O-1, O-2, O-3, O-4 are presented simultaneously on the GUI 7 to the operators 11, it may be difficult for the operator to monitor the industrial process when observing the GUI 7 at a distance, partly because of the small size of the objects O-1, O-2, O-3, O-4, and partly because of the relatively large amount of information presented simultaneously at the GUI 7 with the plurality of objects being displayed thereon.

To this end, the present invention is able to automatically alter the appearance of the GUI 7 between the default mode M-1 and a user-adapted mode M-2, in which user-adapted mode M-2 those objects which are most relevant are displayed on the GUI 7.

FIG. 2*b* shows an example of the system 1 in FIG. 2*a* when the GUI 7 is in the user-adapted mode M-2.

In the user-adapted mode M-2, the objects O-1 and O-4 are displayed and enlarged compared to their size in the default mode M-1. The remaining objects O-2 and O-3 are removed from the GUI 7, i.e. they are not displayed on the GUI 7. The objects O-1 and O-4 define a subset of the plurality of objects O-1, O-2, O-3, O-4 presented on the GUI 7 in FIG. 2*a*.

In one embodiment is also envisaged that in the user-adapted mode M-2 the objects in the subset are presented with the same size as in the default mode M-1. Although the objects are not enlarged compared to their size in the default mode M-1 in this embodiment, it is believed that by presenting less information on the GUI 7, it will be easier for an operator to monitor these objects, without the disturbance from the removed objects.

Beneficially, the operators 11 are thereby able to monitor the industrial process even when they are positioned away from the GUI 7.

The process of determining how to select objects for the subset of objects will now be described in more detail.

Figure 3:
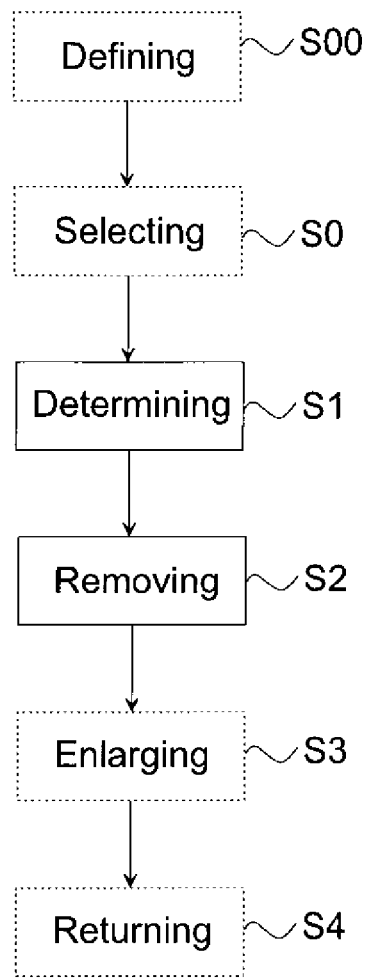
FIG. 3 shows a flow chart of a method for monitoring an industrial process.

FIG. 3 shows a flow chart of an exemplary embodiment for monitoring an industrial process.

In order to be able to determine which of the plurality of objects presented on the GUI 7, in a typical embodiment, each object O-1, O-2, O-3, O-4 is associated with a parameter value. The parameter value determines whether an object is to be selected to the subset of objects which are not removed from being displayed on the GUI 7 in the user-adapted mode M-2.

In one embodiment, the parameter value is determined by a usage rate of that object. In this case each parameter value is determined by statistical data. For instance, the number of user-interactions with an object by means of the operator panel 5 may be used for defining a parameter value.

In another embodiment, the system 1 may further comprise a camera for detecting the eye movement of an operator on the GUI 7. It may thereby be determined which portions of the GUI 7 the user tends to observe. Thereby parameter values for the objects presented on the GUI 7 may be determined by assigning a value to each object depending on to what extent the operator monitors the area of the GUI 7 in which the object lies.

In yet another embodiment, the parameter values for each object are determined by the process as such. Depending where in time the process is, i.e. how far the process has proceeded, different process parameters may be of interest to monitor. Such process parameters may for instance be temperature, solids content, pH of a nominal batch of pulp in a pulp and paper process, thickness and/or flatness vales for a metal strip in different stages of a rolling process. It may typically be known which process parameters are of interest during different parts of the process, wherein said knowledge may be utilized to determine the parameter values of the objects. Hence, the parameter values may depend on time e.g. from the start of the process.

In one embodiment, the parameter value of each object may be determined by combining and weighing the values from all of the previously described methods for determining the parameter values.

In view of the above, in a typical embodiment, the parameter values for each object may be dynamic, i.e. vary in time. However, in some embodiments, some objects may have parameter values that are static, while the remaining objects have parameter values that are dynamic. It is also envisaged that in one embodiment, all of the parameter values are static, i.e. predetermined.

In view of the above, in different variations of the invention, the parameter values may be user-dependent or process dependent or a combination of both.

The method may in a general way be described as follows.

In a step S00, a parameter value for each object is defined.

In a step S0, those objects are selected from the plurality of objects which have a parameter value above a predetermined threshold. Alternatively, in one embodiment, those objects are selected from the plurality of objects which have a parameter value below a predetermined threshold.

In a step S1 it is determined whether a predetermined amount of time of inactivity of the operator panel exceeds a threshold value.

Provided that the threshold value has been exceeded, in a step S2 those objects of the plurality of objects which are not included in the subset of objects are removed from the GUI 7, wherein the subset of objects remain presented on the GUI 7 thereby providing the user-adapted mode M-2 of the graphical user interface.

In a step S3, the objects in the subset of objects are enlarged so that the objects in the subset together fill up the screen of the graphical user interface. The enlarging may typically involve enlarging each object of the subset of objects so that they each have the same size ratio as they had prior to the enlarging step S3.

In a step S4, the GUI 7 returns to the default mode M-1, presenting all of the plurality of objects O-1, O-2, O-3, O-4 simultaneously. The GUI 7 returns to the default mode M-1 upon detection of user input at the operator panel 5.

The person skilled in the art will realize that the present invention is by no means limited to the examples described above. On the contrary, many modifications and variations are possible within the scope of the appended claims such as variations for selecting which process parameters are predetermined and which process parameters are adapted dependent on a history of operator usage.

What is claimed is:

1. A method for monitoring an industrial process with a graphical user interface of an operator panel, the operator panel being operatively connected to the industrial process for communicating with the industrial process,
   wherein the graphical user interface is arranged to present a plurality of objects simultaneously in a default mode, the plurality of objects describing the status of the industrial process, at least some of the plurality of objects being controllable by means of the operator panel for controlling the industrial process, each object of the plurality of objects being associated with a parameter value that depends on how far the industrial process has proceeded, wherein the graphical user interface is arranged to present a subset of the plurality of objects in a user-adapted mode, wherein the parameter value for each object of the subset of objects exceeds a predetermined value, the method comprising:

selecting the subset of objects from the plurality of objects displayed simultaneously on the graphical user interface in the default mode, determining whether a time of inactivity of the operator panel exceeds a threshold value, and, provided that the threshold value has been exceeded, removing those objects of the plurality of objects on the graphical user interface which are not included in the subset of objects, wherein the subset of objects remains displayed on the graphical user interface thereby providing the user-adapted mode of the graphical user interface.

2. The method as claimed in claim 1, further comprising enlarging each object of the subset of objects such that the subset of objects essentially cover the graphical user interface.

3. The method as claimed in claim 1, wherein the selecting is based on statistical data with the parameter values relating to a usage rate of the plurality of objects.

4. The method as claimed in claim 1, wherein the subset of objects comprises at least two objects of the plurality of objects.

5. The method as claimed in claim 1, further comprising returning to the default mode upon detecting activity in the operator panel.

6. The method as claimed in claim 1, further comprising defining the parameter value for each of the plurality of objects.

7. A system for monitoring an industrial process, the system comprising:

an operator panel having a graphical user interface, the operator panel being operatively connected to the industrial process for communicating with the industrial process, wherein the graphical user interface is arranged to present a plurality of objects simultaneously in a default mode, the plurality of objects describing the status of the industrial process, at least some of the plurality of objects being controllable by means of the operator panel for controlling the industrial process, each of the plurality of objects being associated with a parameter value that depends on how far the industrial process has proceeded, wherein the graphical user interface is arranged to present a subset of the plurality of objects in a user-adapted mode, the parameter value for each object of the subset of objects exceeding a predetermined value, and a processor arranged to determine when the graphical user interface is to display the default mode and when to display the user-adapted mode, and to determine whether a time of inactivity of the operator panel exceeds a threshold value, and, provided that the threshold value has been exceeded, arranged to remove those objects of the plurality of objects on the graphical user interface which are not included in the subset of objects, wherein the subset of objects remains displayed on the graphical user interface thereby providing the user-adapted mode of the graphical user interface.

8. The system as claimed in claim 7, wherein the processor is arranged to select the subset of plurality of objects based on statistical data relating to a usage rate of the plurality of objects.

9. The system as claimed in claim 7, wherein the processor is configured to enlarge each object of the subset of objects such that the subset of objects essentially cover the graphical user interface.

10. The system of claim 7, wherein the processor is arranged to define the parameter value for each of the plurality of objects.

11. A computer program stored on a non-transitory computer readable medium, which computer program when executed performs a method for monitoring an industrial process with a graphical user interface of an operator panel, the operator panel being operatively connected to the industrial process for communicating with the industrial process, wherein the graphical user interface is arranged to present a plurality of objects simultaneously in a default mode, the plurality of objects describing the status of the industrial process, at least some of the plurality of objects being controllable by means of the operator panel for controlling the industrial process, each object of the plurality of objects being associated with a parameter value that depends on how far the industrial process has proceeded, wherein the graphical user interface is arranged to present a subset of the plurality of objects in a user-adapted mode, wherein the parameter value for each object of the subset of objects exceeds a predetermined value, the method comprising:

selecting the subset of objects from the plurality of objects displayed simultaneously on the graphical user interface in the default mode, determining whether a time of inactivity of the operator panel exceeds a threshold value, and, provided that the threshold value has been exceeded, removing those objects of the plurality of objects on the graphical user interface which are not included in the subset of objects, wherein the subset of objects remains displayed on the graphical user interface thereby providing the user-adapted mode of the graphical user interface.

12. The method as claimed in claim 1, wherein the industrial process is an automated or semi-automated manufacturing process.

13. The method as claimed in claim 1, wherein the parameter value for each object of the plurality of objects comprises a current or voltage value.

14. The method as claimed in claim 1, wherein the parameter value for each object of the plurality of objects is determined by detecting eye movement of an operator.

* * * * *